July 4, 1967 E. M. WEBER 3,329,820
ARTIFICIAL AND NATURAL ILLUMINATION CONTROLLER WITH
SEQUENTIAL ILLUMINATION
Filed Sept. 30, 1963 3 Sheets-Sheet 1

INVENTOR.
EUGENE M. WEBER
BY
Andrus & Starke
ATTORNEYS

INVENTOR.
EUGENE M. WEBER
BY
Andrus & Starke
ATTORNEYS

July 4, 1967

E. M. WEBER 3,329,820

ARTIFICIAL AND NATURAL ILLUMINATION CONTROLLER WITH
SEQUENTIAL ILLUMINATION

Filed Sept. 30, 1963

INVENTOR.
EUGENE M. WEBER
BY
Andrus & Starke
ATTORNEYS

3,329,820
ARTIFICIAL AND NATURAL ILLUMINATION CONTROLLER WITH SEQUENTIAL ILLUMINATION
Eugene M. Weber, Milwaukee, Wis., assignor to Johnson Service Company, Milwaukee, Wis.
Filed Sept. 30, 1963, Ser. No. 312,757
15 Claims. (Cl. 250—205)

This invention relates to an illumination controller wherein both artificial and natural lighting is controlled to maintain a predetermined illumination level or intensity.

In the illumination control of enclosed working areas such as classrooms and the like, sensing means may be provided to automatically regulate the amount of artifical lighting within the working area to maintain a preselected illumination level. In one system, the light sensing means senses the intensity of the natural lighting and controls the artificial lighting in accordance with the known effect thereof to maintain a predetermined illumination level. Alternatively, the light sensing unit is so placed as to directly sense the illumination level within the room and to control the intensity of the artificial lighting accordingly. Such devices generally provide economy in electric lighting costs.

The present invention is directed to an improved illumination controller for controlling both the natural and the artificial lighting to maintain a predetermined intensity. The natural lighting control portion and the artificial lighting control portion are interconnected such that compensation for excessive illumination is first controlled by reduction of artificial lighting and then of natural lighting whereas for reduced illumination, natural lighting is first controlled to provide maximum illumination and then the artificial lighting is increased. If the natural lighting alone raises the intensity above a preselected level, the window or other light transmitting means is covered and the amount of natural light entering the room is reduced thereby preventing increasing of the level above the selected level.

The present invention controls the upper limit of natural lighting and minimizes the resulting glare to improve the viewing characteristics of the room or enclosure. The upper limit control further minimizes the load placed on an air conditioning means or the like thereby minimizing power costs and increasing the normal life of the conditioning apparatus. Manually controlled or overriding switch means may be provided to establish a shade closed position or a shade open position.

In a preferred construction of the present invention, the lights are arranged in a plurality of parallel rows laterally spaced from the window area of the room. The several rows of lights are controlled by a stepping switch unit driven by a light control motor. The window shade means is controlled by a separate shade control motor. A limit and transfer switch unit interconnects the shade control motor and the light control motor to an illumination control system in a manner providing the previously described sequential operation of the natural and artificial lighting systems. The illumination control unit includes one or more sensing units secured within the room to sense directly the intensity of the lighting in the room and establishing a direct electrical signal in accordance with that illumination for controlling the energization of the respective motors. This electrical signal preferably modulates an electrical pressure transducer and establishes an output pressure signal directly proportional thereto. Pressure switches are connected to the output of the transducer and are actuated in accordance with the illumination level to control the light control motor and the blind control motor. The use of a self-generating current cell in combination with a pressure control system eliminates the necessity of electronic control components and standby power consumption, nor is the system subjected to drift of control point as a result of line voltage variation, aging of electronic components and the like. Pressure switches can be readily readjusted if required without necessity of replacement parts.

The one pressure switch is adapted to be operated at a selected pressure below the pressure established by a selected illumination level. This switch is connected through the limit switch unit to first control the shade control motor to increase the illumination to a maximum and to thereafter transfer a control to the light control motor to increase the illumination by lighting of the rows in succession. The opposite switch is a high pressure switch actuated at a selected pressure above the pressure established by the selected illumination level. The output of the high pressure switch is connected directly to the light control motor to cause the lights to be turned off to reduce the illumination level. If after all of the lights are turned off, the illumination level has not decreased sufficiently, control is transferred to actuate the shade control motor and reduce the illumination by closing of the shade means.

Where the windows are spaced and covered by separately driven shade means, the illumination controller preferably includes a central shade control motor controlling the supply of fluid to individual hydraulic motors for the several shade means. Where a plurality of rows of lights is employed, it has been found desirable to maintain the innermost row of lights on at all times. The present invention provides a relay or the like which is actuated by setting of the unit into an automatic control position to turn on the innermost row of lights and to maintain them on during all subsequent automatic control operations.

Further, in accordance with the present invention, it may be desirable to provide for a pair of separate shades or drapes; one of which is substantially light interrupting and the second of which is completely opaque in order to provide for a normal drape control in combination with a total darkness closure. The positioning drive for the drapes may be interconnected by a suitable limit and transfer unit for sequential operation under the operation of the automatic control. A manual switch means is provided for connecting the positioning drive for the drapes in an independent closing circuit.

The present invention thus provides an improved illumination controller for maintaining a selected illumination level.

The drawings furnished herewith illustrate the best mode presently contemplated for carrying out the invention and will more fully disclose and explain to those skilled in the art the many advantages and functions of the present invention.

In the drawings:

FIG. 1 is a block and line diagram disclosing an illumination controller for controlling the natural and artificial lighting to maintain a selected lighting or illumination level;

FIG. 2 is a schematic circuit diagram illustrating a preferred construction of the controller shown in FIG. 1;

Figure 3:
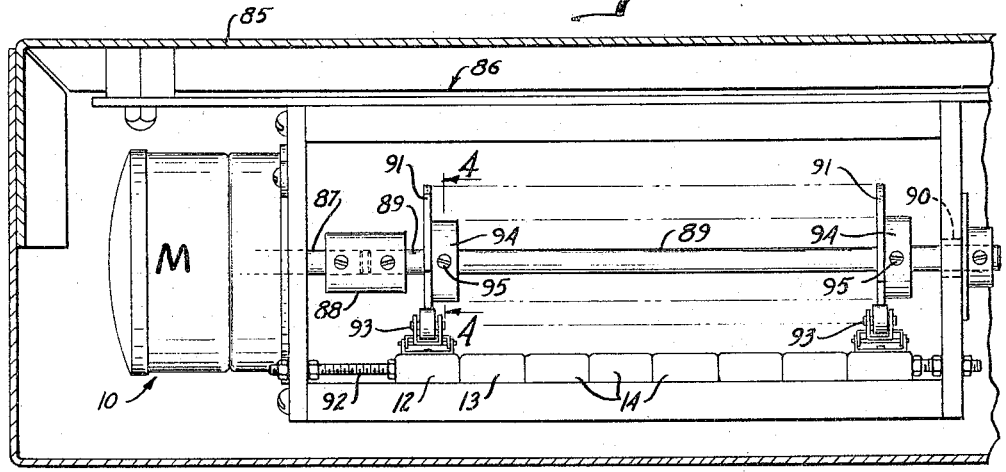
FIG. 3 is an elevational view of switch system for the system shown in FIGS. 1 and 2.

Referring to the drawing and particularly to FIG. 1, a fragmentary portion of a work area such as a school classroom 1 is shown having a window 2 in the outside wall thereof, an inner wall 3 and a plurality of lamps or individual lights 4 which are secured to the ceiling for artificial illumination of the classroom 1. In the illustrated embodiment of the invention, the lights 4 are arranged in three rows 5, 6 and 7 laterally spaced and extending parallel to the window 2 with row 5 adjacent the window and row 7 adjacent the inner wall 3. A venetian blind 8 is mounted to the inside of the window 2 and is adapted to be opened and closed to increase or decrease the natural lighting, as hereinafter described. The illustrated embodiment of the invention employs a closed loop system having a light responsive or sensitive cell unitl 9 mounted on the ceiling of room 1 and interconnected to an illumination level control system for selective operation of a lamp control motor 10 and a blind control motor 11.

The light sensitive cell unit 9 may be any known or suitable unit such as one or more self-generating cells which converts light to a current signal in proportion to illumination intensity striking the cell. Further, although a single unit 9 is shown, several spaced cells may be employed in large rooms with the average output forming the control signal.

Motor 10 is coupled to a switch bank having a limit switch 12, a limit-transfer switch 13 and three light switches 14, one for each of the light rows 5, 6 and 7 for controlling the artificial lighting. Motor 11 is coupled to position blind 8 for controlling the natural lighting and is further coupled to a limit switch 15 and a limit-transfer switch 16.

The motors 10 and 11 are connected in energizing circuits including the limit switches 12 and 15 and the transfer switches 13 and 16 which provide interrelated control of the blind 8 and lamps 4 to maintain a predetermined illumination level.

The illumination level control in the illustrated embodiment of the invention includes a transducer 17 having an air input or supply line 18 and an air output or pressure line 19 interconnected to control a pressure switch 20 connected to limit switch 13 of motor 10 and a normally closed pressure switch 21 connected to a manual control switch 22 for selective connection to limit switch 12 of motor 10 or switches 15 and 16 of motor 11.

The light sensitive cell 9 is connected to the transducer 17 and provides an electrical signal which regulates the interconnection of air supply line 18 to output air line 19 in a manner providing an output pressure signal proportional to and in accordance with the output of the light sensitive cell 9.

Pressure switch 20 is a high-pressure switch responsive to increasing pressure occasioned by increasing illumination. Pressure switch 20 is operative to first turn off lights 4 and thereafter close blind 8 if the pressure rises above a preset level. Pressure switch 21 is a low pressure switch and is actuated in response to predetermined decreased illumination to open the blind 8 and thereafter turn on lights 4, if necessary. A null pressure range is provided within which neither switch 20 or 21 is actuated and corresponds to a preset illumination range.

The pressure switches 20 and 21 are interconnected to actuate motors 10 and 11 to adjust the artificial and natural lighting in a manner providing a preset level of illumination within the room 1. Motors 10 and 11 are interlocked through the switches 12, 13, 15, 16 and 22 as diagrammatically shown in FIG. 1 such that the blind motor 11 will be first actuated to control natural illumination but in reducing illumination operates only when the lights 4 are off.

The operation of the invention, as shown in FIG. 1, is briefly described, as follows, with the blind 8 initially open, lamps 4 on such that the lamps and the natural lighting are providing the predetermined light intensity desired for room 1. The switch 22 is set to place the blind motor 11 in the circuit of the illumination control which is in full automatic control. The cell 9 establishes an electrical output signal indicative of the proper illumination such that transducer 17 is thereby actuated to transmit a pressure signal within the dead or null range between settings of the switches 20 and 21.

As daylight or natural lighting increases, the light intensity increases and causes the output of the cell 9 to increase and the pressure signal from transducer 17 to increase accordingly. At a selected maximum intensity, the pressure increase is sufficient to actuate switch 20 and complete a circuit to motor 10 through limit-transfer switch 13 for rotating motor 10 in a direction actuating the switches 14 to successively turn off the lamp rows 5, 6 and 7 beginning with row 5 and thereby reducing the illumination level. If the lamps 4 are completely turned off and there is still excessive illumination in the room 1, the output of the cell 9 maintains the operating output pressure signal in line 19 at a level actuating switch 20. The signal is then transferred by the switch 13 through switch 22 and the limit switch 15 to energize blind motor 11 in a direction to close the venetian blind 8 to further diminish the natural lighting until proper illumination is established and reflected in energization of cell 9.

If the illumination level in room 1 subsequently drops below a predetermined level, the output of the cell 9 is decreased and reduces the output pressure signal at the line 19 below the minimum set pressure for switch 21. This actuates the pressure switch 21 which is connected through switch 22 and limit-transfer switch 16 to first energize the blind motor 11 to open the blind and to thereafter energize motor 10 to turn on the lamps 4, beginning with row 7 adjacent the inner wall 3 and moving outwardly to the rows 6 and 5.

A preferred schematic circuit of a system incorporating the elements shown in FIG. 1 is given in FIG. 2 and corresponding elements in FIGS. 1 and 2 are similarly numbered.

In FIG. 2, a main on-off switch 23 of a double-pole double-throw construction has an automatic position connecting the control unit to power lines 24 and 25 and an off position connecting motor 10 directly to lines 24 and 25 to turn off lights 4. For purposes of simplicity, power line 24 is shown as a ground line with the known symbol 26 and the line 25 is shown and hereinafter described as the hot line. In the subsequent circuitry, the grounded side of the several components will be connected to a lead having the conventional ground symbol.

The lamp control motor 10 is shown as a reversible motor having a forward or lamp-on winding 27 and a reverse or lamp-off winding 28 interconnected at one end to each other and to a common ground line 29 and having the opposite ends connected to switches 12 and 13. Limit switch 12 is shown as a single-pole, double-throw unit connected by a lead 30 with lamp-on winding 27 and to the hot line 25 and limit-transfer switch 13 is shown as a similar unit connected by a lead 31 to the lamp-off winding 28 and to the hot line 25, as hereinafter described. Switch 12 is described in detail with the same elements of switch 13 similarly numbered with superscript primes.

Switch 12 includes contact arm 32 selectively engaged with lamp-on contact 33 and a lamp-off contact 34. Contact arm 32 is connected to the switch 22 as hereinafter described and the contact 34 is connected by lead 30 to the lamp-on winding 27. Contact 33 is a dead contact.

Switch 13 has the contact 33' connected by lead 31 to the lamp-off winding 28 and the contact 34' connected to the switch 22. The contact arm 32' is connected to the pressure switch 20 and to the on-off switch 23 to provide for turning off of the lamps 4 under the action of the automatic illumination control with switch 23 in the automatic position and directly when the latter is in the off position.

The lamps 4 in the several rows 5, 6 and 7 are connected in parallel within the respective rows. The rows are individually and sequentially controlled by three similar switches 14. Switch 14 for lamp row 7 is described and the corresponding elements of switches 14 for rows 5 and 6 are similarly numbered with a superscript prime and a double prime added respectively to distinguish therebetween.

Switch 14 includes a contact arm 35 connected by a lead 36 to the hot line 25 and a contact 37 connected to the one side of the paralleled lights 4. The opposite side of the row 7 is grounded. In the illustrated position, all rows 5, 6 and 7 of lights 4 are energized. They can be turned off by positioning switch 23 to the off position or by operation of illumination control, as hereinafter described.

Switch 23 is a double-pole, double-throw switch having a pair of mechanically interconnected contact arms 38 and 39 connected to power line 25 and selectively engageable with a pair of automatic contacts 40 and 41 and off contacts 42 and 43.

The off contact 43 is a dead contact whereas contact 42 is connected to contact arm 32' of switch 13 for manually controlling motor 10. When switch 23 is moved to the off position and the lamps 4 are such that switches 12 and 13 are in the illustrated full line position, motor winding 28 is connected in the following completed circuit across the power lines 25 and 26: beginning at line 25 to the contact arm 38, contact 42, contact arm 32' and contact 33' of switch 13, motor winding 28 and the return or grounded line 29. Motor 10 operates to open associated switches 14 and break the circuit to the respective rows 5, 6 and 7 of lamps 4. The motor 10 also moves contact arm 32' from contact 33' and thereby opens the above energizing circuit for the motor 10 which stops after opening of all switches 14. The proper timed movement of the switches is provided by suitably shaped cams or the like which are coupled to be driven by motor 10, as more fully described hereinafter with respect to FIGS. 3 and 4.

The automatic contacts 40 and 41 of switch 23 interconnect winding 27 and 28 in the control for illumination control as hereinafter described.

Generally, in larger classrooms and the like, it has been found advisable under all normal conditions to maintain the inner row 7 of lights 4 energized. This is provided through an interlock relay 44 having a winding 45 connected between automatic contact 40 of switch 23 and ground such that relay winding 45 is energized whenever the switch 23 is placed in the automatic position. The winding 45 controls a set of normally open contacts 46 connected across the switch 14 for row 7. If desired, additional relay contacts 46' may be provided for installations which may require similar treatment of additional light rows. Although three lighting rows are shown in the illustrated embodiment of the invention, many more rows will often be provided depending on the size of the room and the like.

Relay 44 thus effectively disconnects one or more of the rows of lamps from the illumination control and the action of the lamp motor 10. In FIG. 2, rows 5 and 6 are interconnected for control by the motor 10 which in turn is controlled by the action of the pressure switch units 20 and 21.

Referring to FIG. 2, similar pressure switches 20 and 21 are mounted on opposite sides of a single diaphragm actuator 47 which is coupled to respond to the transducer output as modulated by the photocell 9.

Switch 20 is disposed to the left side of the actuator 47 and is schematically shown having a set of contacts 48 connected respectively at one side to automatic contact 41 of switch 23 and at the opposite side to contact arm 32' of the limit-transfer switch 13.

A bridging contact member 49 is biased in spaced relation to contacts 48 by a suitable spring 50 and has a depending plunger 51 in the path of the outer end of an operating arm 52. The operating arm 52 is pivotally mounted at the center as at 53 with the opposite end of the arm aligned with and coupled to a bellows or expansion chamber 54 of the actuator 47.

Switch 21 is similarly constructed and mounted to the opposite side of the actuator 47 and corresponding elements are similarly numbered with a superscript prime added. Switch 21 however is mounted beneath the outer end of the arm 52' with a switch plunger 51' projecting upwardly in the path thereof.

The illustrated diaphragm actuator 47 is shown including a mounting frame 55 having diaphragm chamber 54 secured to the underside. Air line 19 is connected to the top of chamber 54 which expands and contracts in a vertical direction in accordance with changes in the output pressure signal from transducer 17 and thereby simultaneously pivots operating arms 52 and 52' for operation of switches 20 and 21.

Transducer 17 in FIG. 2 is a suitable or conventional electro-pneumatic relay or device 56 having a control winding 57 connected to the output of the photocell unit 9. The output pressure of the device varies with the output of the cell 9 and thus varies the position of the diaphragm chamber 54 in accordance with the output of cell 9.

The arms 52 and 52' are positioned with respect to the plunger of switches 20 and 21 to provide for a dead or null zone wherein the switches are held in a non-actuated position, as described with respect to FIG. 1.

The central settings of the pressure switches, for example, may be such that the switch 21 is closed at all pressures below 6 p.s.i. (pounds per square inch) whereas the switch 20 is closed at all pressures above 7 p.s.i. Between the 6 and 7 p.s.i., a dead zone is established corresponding to a predetermined illumination level in room 1 as sensed by cell 9.

The limit switches 15 and 16 are provided to interrelate and control the natural lighting as well as the artificial lighting.

The illustrated switches 15 and 16 respectively include a single-pole, double-throw closed blind limit switch 58 and a similar single-pole, double-throw open blind limit-transfer switch 59 interconnected to control the blind motor 11.

Motor 11 is shown as a reversible motor similar to motor 10 having a closing winding 60 and an opening winding 61 interconnected at one end to a grounded line 62. The opposite ends of the windings 60 and 61 are connected in the circuit by switches 58 and 59 for operation as hereinafter described.

Switch 58 includes a contact arm 63 engageable with a closed blind contact 64 and an open blind contact 65. Arm 63 is positioned by a switch cam 66 which is coupled to motor 11 for positioning in accordance with the venetian blind 8. The illustrated switch cam 66 includes a projection 67 pivotally secured as at 68 to contact arm 63 and a cam slot 69 with a small rod 70 slidably disposed therein. A biasing spring 77 is mounted to urge cam 66 to the position engaging arm 63 and contact 65. The rod 70 is coupled to the motor 11, as shown by a dashed coupling line, and is moved proportionately in opposite directions such that its position within the slot is indicative of the position of the venetian blind 8. As shown in FIG. 2, rod 70 engages the right end of slot 69 corresponding to a fully open blind position with contact arm 63 in engagement with contacts 65 and conditions a circuit to winding 60 for closing of the venetian blind 8. When the rod 70 is moved to the opposite end and the blind 8 is fully closed, the rod 70 engages the opposite end of slot 69 and moves it to the left in FIG. 2 and thereby moves contact arm 63 from contact 65 to break the circuit to winding 60 and into engagement with a dead contact 64.

The single-pole, double-throw blind limit switch 59 is similarly formed with corresponding elements denoted by corresponding numbers with superscript primes added.

In switch 59, however, the spring 71' urges the cam 66' in the opposite direction to hold arm 63' engaging contact 64' except when rod 70' is moved to the extreme right corresponding to a fully open blind position. In the latter position, rod 70' positively holds cam 66' to the right and moves contact arm 63' in engagement with contact 65'.

Switches 58 and 59 are connected in the automatic control via the switch 22 which is shown in FIG. 2 as a double-pole, double-throw switch similar to switch 23. Switch 22 includes a pair of contact arms 72 and 73 electrically connected together by a jumper lead 74 and selectively engageable with a pair of automatic control contacts 75 and 76 and a pair of blind close contacts 77 and 78.

When contact arms 72 and 73 engage contacts 77 and and 78, the blind motor 11 is energized to close the blind 8 and the motor 10 is energized to turn on the lights 4, as a result of the following circuits.

Blind close contact 77 is connected to power line 25 and blind close contact 78 is connected by a lead 79 to switch 12 of motor 10. Contact arm 72 is connected to the contact arm 63 of switch 58 by a lead 80 and thus supplies power from contact 77 to winding 60 to energize motor 11 to close blind 8. Contact arm 73 which is connected to arm 72 by lead 74 supplies power to contact 78 and therefrom to switch 12 via lead 79 for operating motor 10. In the illustrated circuit position, lamps 4 are all on and motor 10 is not actuated. If the lamps 4 were off, switch 12 would be in the alternate position and power would be supplied via the contact 34 and lead 30 to winding 27 to actuate motor 10 and turn on the lights 4 simultaneously with the previously described closing of blind 8.

In the automatic position, switch 22 connects limit switches 58 and 59 and thereby motor 11 in circuit with the illumination sensing control as follows.

Automatic contact 75, associated with contact arm 72, is connected by a lead 81 to the contact 34' of switch 13 of motor 10. The contact arm 72 is connected by the lead 80 to contact arm 63 of limit switch 58 and thereby connects the closing winding 60 in circuit with the switch 20 via motor operated switch 13 for closing the blind 8, after lights 4 are turned off.

Automatic contact 76, associated with contact arm 73, is connected to the contact arm 63' of switch 59 by a lead 82. Contact arm 73 is connected by a lead 83 to the one side of contacts 48' of switch 21 and is thereby connected to line 25 to energize the blind opening winding 61 for opening the blind 8 prior to turning on of lights 4 for increasing illumination.

The above described circuit of FIG. 2 provides for controlling the illumination level to a predetermined intensity by regulation of the position of blind 8 and energization of lighting rows 5, 6 and 7.

The operation of the illustrated embodiment of the invention is summarily described as follows.

The photocell 9 is mounted adjacent the ceiling and establishes an output in accordance with the illumination level. The cell 9 converts the light level to a proportionate current which in turn is fed to the transducer winding 57 of transducer 17 for modulating the air pressure fed to the chamber 54 of actuator 47 and thereby pivoting arms 52 and 52' with respect to the pressure switches 20 and 21, which are set respectively for actuation at predetermined pressure signals. Thus, as previously noted, switch 20 is set such that it is closed at all pressures above 7 p.s.i. whereas switch 21 is closed at all pressures below 6 p.s.i. When the pressure is between 6 and 7 p.s.i., both switches will be open holding the motor circuits open and the illumination will be at the dead zone until outdoor or natural lighting changes.

When the switch 23 is thrown to the automatic position, the interlock relay 44 is energized to close its contacts 46 and shunt the switch 14 for row 7 of lights 4 adjacent the inner wall 3. Row 7 is therefore turned on and maintained on under all lighting conditions.

The circuit as shown also has rows 5 and 6 of lamps 4 on and the blind 8 fully open, for example, as may occur during early morning hours.

If the natural lighting increases, the illumination level rises above the desired preset level, the output of the cell 9 and therefore the pressure in line 19 will be proportionately increased and be above the preset 7 p.s.i. for controlling switch 20. At slightly above 7 p.s.i., the arm 52 pivots sufficiently to close switch 20 and thereby connect the motor 10 across power lines 24 and 25 to turn off the lights 4 as follows: beginning at line 25, contact arm 39 and contact 41 of switch 23 to the now closed switch 20 to contact arm 32' and contact 33' of switch 13, lamp-off winding 28 and grounded line 29.

Operation of motor 10 sequentially and in timed spaced relation opens switches 14", 14' and 14 to turn off the lights 4 in rows 5 and 6. Lights 4 in row 7 remain on as a result of the relay 44. Thus, row 5 is first turned off and motor 10 operates for a short period without further switch operation. If the illumination level is now proper, the output of cell 9 decreases the pressure signal to chamber 54 which contracts and pivots arm 52 counterclockwise and opens switch 20 whereupon motor 10 is de-energized.

If the motor 10 is energized to turn off all of the lights 4, the switches 12 and 13 are also driven to the opposite position, breaking the circuit to motor winding 28 and completing a circuit to blind motor 11, if illumination is still excessive, as follows: beginning with power line 25, contact arm 39 and contact 41 of switch 23, now closed switch 20, contact arm 32' and contact 34' of switch 13, lead 81 to contacts 75 of switch 22, contact arm 72, lead 80, contact arm 63 and contact 64 of limit switch 58, closing winding 60 of motor 11 and ground line 62. Motor 11 begins to close blind 8 until the illumination level drops to the desired level and switch 20 opens to break the above circuit.

As the blind 8 closes, rods 70 and 70' of limit switches 15 and 16 move to the left. Switch cam 66 is held by spring 71 in the normal position shown. Switch cam 66' however is moved to the left by spring 71' and reverses the position of switch 59 to connect the contact arm 63' to contact 65' which is connected to the blind opening winding 61 of motor 11.

If the illumination level now decreases below the control point and as a result the output signal from the cell 9 actuates device 56 to create a relatively low pressure signal to the chamber 54, arm 52' pivots clockwise and switch 21 closes. This will complete the circuit to the winding 61 of the blind motor 11 as follows: beginning with power line 25, contact arm 39 and contact 41 of switch 23, now closed switch 21, lead 83, to contact arm 73 of switch 22, lead 82, contact arm 63' and the now engaged contact 65' of limit switch 59, the blind 8 being partially closed, to winding 61 of motor 11 and ground line 62. The motor 11 then operates to open the blind 8 resulting in increased illumination as a result of the natural lighting and an increased output signal of cell 9. The transducer 17 progressively increases the pressure output signal at line 19 and therefore the signal applied to the chamber 54. As the pressure increases, the arm 52' pivots counterclockwise and at a pressure slightly above 6 p.s.i. the switch 21 opens. As a result, the above circuit is broken and the system is in the dead or null zone with the pressure between 6 and 7 p.s.i. and both switches 20 and 21 opened.

If in the latter system, motor 11 is actuated to completely open the blind 8 and there is still insufficient daylight to reduce the pressure into the dead zone, the continued excessive pressure holds switch 21 closed but the operating circuit is switched to energize motor 10 through the operation of the limit switch 59. When blind 8 is fully open, the rod 70' has moved to the extreme right position and opens the circuit to opening winding 61 and connecting arm 63' to contact 64'. This completes a circuit to the lamp switch motor 10 and results in a rotation of the motor in the lamp-on direction, as follows: beginning with power lines 25, switch 23, switch 21, lead 83, switch 22, lead 82, arm 63', now engaged contact 64', a lead 84 connecting contact 64' to contact 78 of switch 22, lead 79 to contact arm 32 and contact 34 of switch 12, winding 27 and grounded line 29. Motor 10 then operates to sequentially close the switches 14, 14' and 14" and turn on the corresponding lamps 4 until the illumination level increases sufficiently to increase the pressure above 6 p.s.i. and into the dead zone at which time switch 21 opens and breaks the above circuit to the motor 10.

Thus, under normal operation, the dead zone corresponds to a predetermined illmination level within the room 1 and if such intensity or level varies above or below the desired band width, the controller initiates appropriate action to reverse the illumination until the desired level falls within the band width or the dead zone. Generally, the desired level will be set to provide an intermediate pressure such as the 6½ p.s.i. suggested in the previous description, when all of the room lights are on and the blind is closed.

Figure 4:
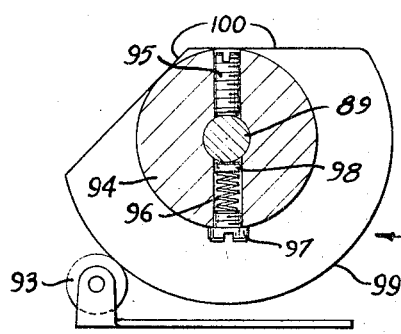
FIG. 4 is a sectional view taken on line 4—4 of FIG. 3.

Referring particularly to FIGS. 3 and 4, an elevational view of the motor 10 and the switching unit of FIG. 2 for controlling the lights 4 and the motor 10 is shown including an outer housing 85 within which the other components of the control may also be housed. A motor and switch mounting frame assembly 86 is secured to a wall within housing 85. The motor 10 is secured to one side of assembly 86 with a motor shaft 87 projecting laterally therefrom into the assembly. A coupling 88 interconnects the motor shaft 87 with a cam shaft 89 which is rotatably secured at the outer end in a bearing unit 90 at the opposite end of assembly 86. Operating cams 91 are clamped to the shaft 89 with each one being aligned with one of the switches 12, 13 and 14 for actuation thereof, as previously set forth.

The several switches are secured within the mounting assembly 86 by suitable clamping and mounting bolt units 92. The switches which are of any suitable construction are shown in elevation and each includes a switch arm 93 biased outwardly into engagement with the periphery of the adjacent cam 91, as most clearly shown in FIG. 4.

Each of the cams 91 is slidably disposed on shaft 89 and one unit is described with reference to FIG. 4. The cam 91 includes an attachment and spacing hub 94. A diametrical tapped opening is formed in hub 94 with a locking screw 95 threaded in one side into bearing engagement with the cam shaft 89 to releasably lock the cam in a predetermined angular position. A coil spring 96 is disposed in the tapped opening to the opposite side of shaft 89 and is held in place by a cap screw 97. A spring pad 98 is disposed between the inner end of the spring 96 and the shaft 89 and frictionally bears on the shaft to resiliently hold the cam in a preset angular position on shaft 89 when screw 95 is released. If desired, cam 91 can be angularly repositioned on the shaft 89 by releasing screw 95, holding cam 91 against movement and manually turning the cam shaft 89.

Each cam 91 has its periphery formed to hold the aligned switch in the alternate circuit position described with respect to FIG. 2. Each periphery includes an arcuate portion 99 joined by chordal portions 100. In operation, alignment of the arcuate portions 99 with a switch, as a result of rotation of shaft 89, causes depression of the associated switch arm 93 and actuation of the corresponding switch. When the cam 91 is driven to align a chordal portion 100 with the corresponding switch, the arm 93 moves outwardly and the associated switch returns to the alternate position. The length of the arcuate portion of the cams provides the switch actuation as described more specifically with respect to the embodiment of FIG. 2 and no further description thereof is deemed necessary.

The present invention can be employed with any suitable light interrupting means for controlling the artificial light, the blind system shown in FIGS. 1 and 2 being given for simplicity of description. In certain applications, drapes are caused to cover the window and in some cases it is desirable to have a totally light opaque drape for covering the windows; for example, during the use of visual aid devices such as movies and the like. The embodiment of the invention shown in FIG. 5 includes a pair of drapes 101 and 102 adapted to be connected in the circuit of FIG. 2 and only so much of the circuit necessary to show the connection is given in FIG. 5.

Figure 5:
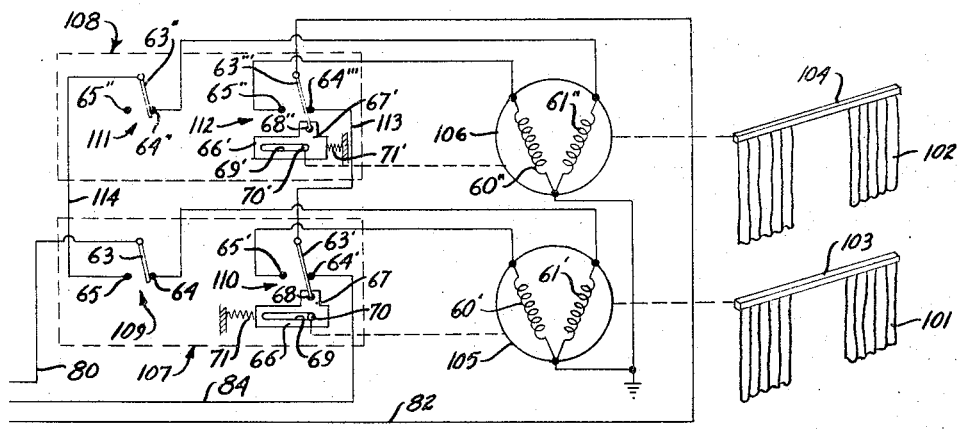
FIG. 5 is a schematic view of the blind control portion showing a construction for controlling a pair of drapes.

In FIG. 5, drape 101 is a normal drape which will substantially but not completely exclude natural lighting and is hereinafter referred to as a low density drape. The drape 102 is a completely opaque drape and is hereinafter identified as a high density drape. The drapes 101 and 102 are interconnected in the circuit in a manner whereby the low density drape 101 closes first and opens last whereas the high density drape 102 is oppositely operated to open first and close last.

The drapes 101 and 102 are mounted on separate tracks 103 and 104 respectively for individual closing and opening movement with respect to the window. Individual motors 105 and 106 are coupled one each to drapes 101 and 102 and are interconnected to any suitable illumination controller by limit switch units 107 and 108. Each of the motors 105 and 106 is similar to the blind motor 13 of FIG. 2 and the corresponding elements are similarly numbered with single and double primes.

In FIG. 5, a limit and transfer switch unit 107 is coupled to the control motor 105 for drape 101 and limit and transfer switch unit 108 is coupled to the motor 106 for the drape 102. The limit switch units 107 and 108 correspond to the limit switch unit of FIG. 2. The three leads 80, 82 and 84 from switch unit 22, not shown in FIG. 5, correspond to the leads in FIG. 2 and are connected to control motors 105 and 106 as follows.

The limit switch unit 107 includes a limit switch 109 and a limit-transfer switch 110 corresponding respectively to the switches 58 and 59 in FIG. 2. The limit switch unit 108 similarly includes a pair of limit switches 111 and 112 similarly corresponding to the switches 58 and 59. The limit switches 109 and 110 are numbered in accordance with the numbering of the switches 58 and 59 in FIG. 2 and the switches 111 and 112 will be similarly numbered with double and triple primes added thereto to clearly distinguish the corresponding elements in the subsequent description.

Incoming line 84 is connected to the contact 64' of limit switch 110 generally similar to the interconnection of the line 84 in FIG. 2. Similarly, line 82 is interconnected to the contact arm 63" of limit switch 112 to provide interconnection to the respective switches. Contact 64 of switch 109 is connected to the closing winding 61' of motor 105 and the contact 65' of switch 110 is connected to the opening winding 60' of motor 105 generally similar to the interconnection of the corresponding elements in FIG. 2. In the embodiment of FIG. 5, however, the contact arm 63' is connected by a lead 113 to the contact 64'" of limit switch 112 and thereby through the lead 82 to switch 22, not shown in FIG. 5.

As shown in FIG. 2, lead 82 is connected by switch 22 via line 83 to pressure switch 21 which is actuated in response to a decreased level of illumination. Thus, if the drapes 101 and 102 are to be opened, power is fed from switch 21 through switch 22 to the switch 112. When the drapes are closed, switch 112 is in the alternate position shown and consequently feeds power to the high density drape motor 106 to open the drape and increase the lighting. If the complete opening of drape 102 does not sufficiently increase lighting to reset the illumination controller to the null position, the switch 112 reverts to the full line position shown in FIG. 5 and transfers power to the limit switch 110 for motor 105. Switch 110 will also be in the alternate position as a result of the previous closing of the drape 101 and the power is transferred to opening winding 60' of the motor 105 causing it to open. If the drape 101 is completely opened and the illumination level is still inadequate to reset the control to a null position, the signal will be transferred via the line 84 to the motor 10 as shown in FIG. 2.

The switch units 107 and 108 are also connected in the closing path or circuit through the switches 109 and 111 by a lead 114 which interconnects the contact 65 of switch 109 to the switch arm 63" of limit switch 111. Switches 109 and 111 are shown in the position corresponding to fully opened drapes 101 and 102. The cam mechanism for positioning of switches 109 and 111 has not been shown in FIG. 5 for simplicity of illustration. Thus, if the illumination level increases, the illumination control of FIG. 2 is actuated to turn off lights 4 after which the signal appears at line 80. The signal is impressed on the switch 109 and therefrom on the closing winding 61' of the motor 105 which will begin to close the low density drape 101. Upon complete closing thereof, switch 109 is placed in the alternate position from that shown with the contact arm 63 engaging the normally open contact 65 which is connected by the lead 114 to the contact arm 63" of switch 111. If the illumination level has not decreased sufficiently to replace the control in the null position, the signal or current is transferred to the switch 111, which is in the full line position shown, and then to the closing winding 61" of the high density drape motor 106 which begins to close the high density drape 102 and further reduce the lighting.

As described above, the drapes 101 and 102 are actuated in the proper sequence with the low density drape 101 being the first to be closed and the last to open, and high density drape 102 being the first to open and the last to close. Manual positioning of switch 22 to a blind close position closes both of the drapes 101 and 102, as shown in FIG. 2.

Figure 6:
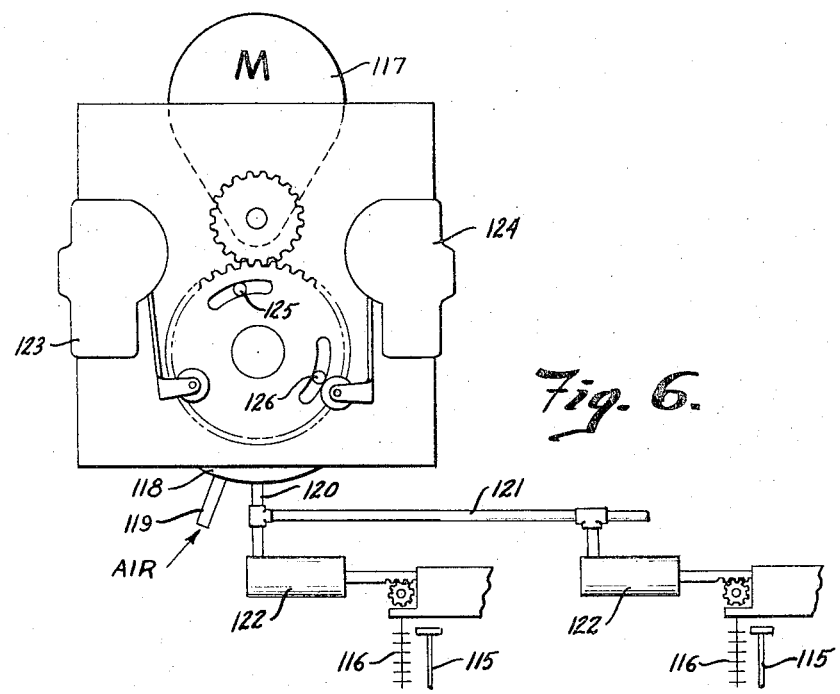
FIG. 6 is a diagrammatic illustration of alternative shade or cover drive systems for a plurality of individual drape and window units.

As diagrammatically shown in FIG. 6, spaced individual window units 115 may be provided with individual covering means, shown as blinds 116, in certain installations. The individual blinds 116 may advantageously be simultaneously actuated by a single reversible control motor 117 corresponding to motor 11 of FIG. 2, as follows.

Motor 117 is coupled to an adjustable pressure control 118 having a supply line 119 and an outlet or operating line 120 connected to a common header or distribution line 121. Hydaulic motors 122 are connected to the common line 121 and driven in opposite directions in accordance with the position of control 118. Motors 122 are coupled one each to each of the blinds 116 and simultaneously position the blinds.

In FIG. 6, switches 123 and 124 are shown mounted on opposite side portions of the motor-control assembly and corresponding in operation to the limit switch 58 and limit and transfer switch 59 of FIG. 2. Adjustable pins 125 and 126 are coupled to the motor 117 or the pressure control 118 and moved in timed relation therewith to actuate switches 123 and 124 in the same manner as that set forth with respect to FIG. 2. The motor 117 is thus actuated to simultaneously operate the hydraulic motors 122 to similarly position blinds 116. The use of single electrical motor controlling a plurality of hydraulic motors minimizes the initial cost of the system and provides a reliable and long life system.

Figure 7:
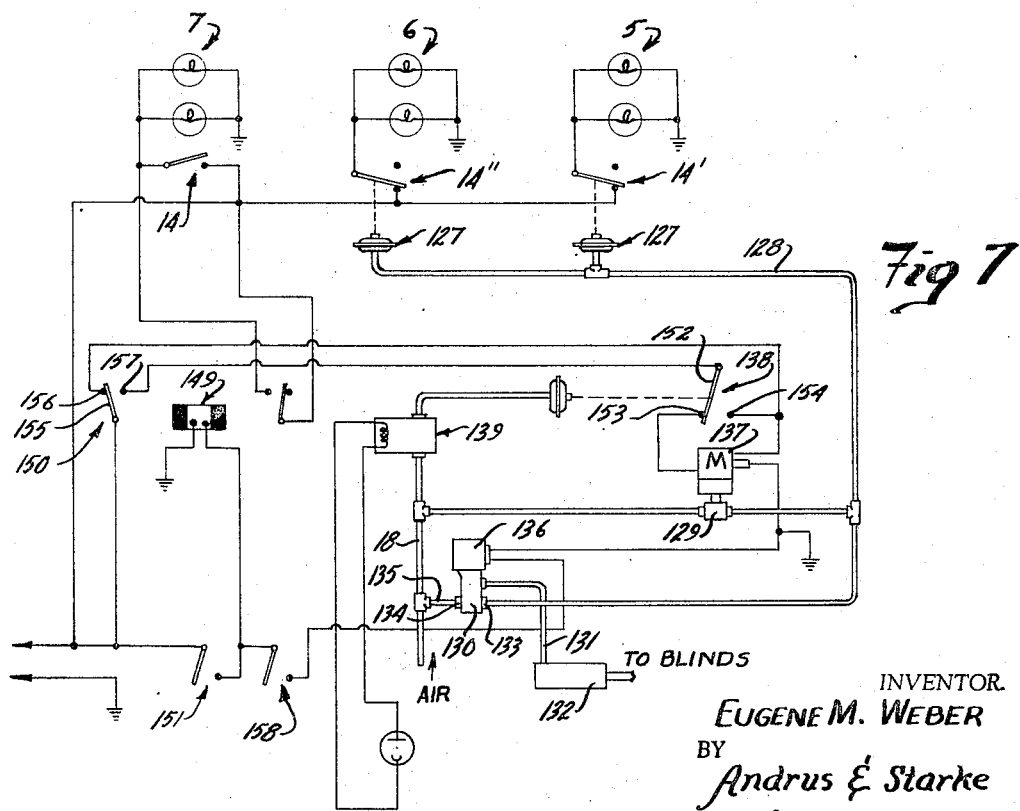
FIG. 7 is a schematic diagram of a fluid operated system and means for actuating artificial lighting means and shade means to control the illumination of an enclosure.

The invention may also include a fluid operating control system for both the lighting means and the shade means; for example, as schematically shown in FIG. 7. The corresponding components of FIGS. 2 and 7 are similarly numbered for simplicity of description. Individual control switches 14 selectively connect lamp rows 5, 6 and 7 to incoming power lines 24 and 25 and a cell 9 controls a transducer 17 for regulating the illumination.

In FIG. 7, however, switches 14 are positioned by fluid operated actuators 127 diagrammatically shown as diaphragm units. The actuators 127 are connected such that they expand with increasing pressure to open switches 14 and contract with decreasing pressure to close switches 14. A common header or line 128 is connected to actuators 127 and selectively connected to the input or supply line 18 by a control pressure regulator 129. Line 18 is also connected to a blind control valve 130 having an output line 131 connected to drive or actuate a fluid operated motor 132 coupled to the blind, not shown.

The blind control valve 130 has a first input connection or tap 133 connected to line 128 and a second tap 134 connected directly to the supply line 18 by a line 135. A control solenoid 136 controls the position of valve 130 for selective connection of output line 131 to the inputs 133 and 134. Valve 130 normally connects output line 131 to the first input tap 133 and therefore to line 128 to provide interrelated control with the lights 4. When the solenoid 136 is energized, it establishes the second position of the valve 130 connecting lines 134 and 131 to impress full supply pressure onto the motor 132 which is then actuated to close the associated blind.

In FIG. 7, interlocking control establishes sequential operation similar to that set forth with respect to FIG. 2 as a result of providing pressure differential operational settings of the respective switches 127 and the motor 132. Switch 14 for the intermediate lamp row 6 for example may operate to turn on the light at 6 p.s.i. and to turn off lights 4 at 7 p.s.i. Switch 14 for the row 5 adjacent the window would turn on at 5 p.s.i. and off at 6 p.s.i. Motor 133 is such that when the pressure rises above 7 p.s.i. by a selected amount, the blind is closed and conversely as it drops below the closing pressure by a selected amount, the blind opens.

The pressure regulator 129 determines the pressure in line 128. Pressure regulators are well known and no further description thereof is given. The regulator 129 is driven by a reversible motor 137, similar to motor 10 or 11 of FIG. 2, which is connected to a power supply by a high-low pressure switch 138 connected in a motor energizing circuit.

A transducer unit 139 corresponding to that of FIG. 2 is coupled in response to the output of sensing cell 9.

An interconnecting relay 149 is provided to control the innermost row of lights 7 as in FIG. 2 and further includes a set of contacts or a switch unit 150 which is interconnected with the pressure switch unit 138 to the power supply lines 24 and 25.

An on-off switch 151, which is normally open, interconnects relay 149 to the power lines 24 and 25. When switch 151 is closed the relay is energized.

More particularly, the high-low pressure switch 138 includes a contact arm 152 positioned either between or in engagement with a low pressure contact 153 or a high pressure contact 154. The unit includes a dead zone, for example, between the 6 and 7 p.s.i. as previously provided for the switch of FIG. 2, wherein the arm 152 is between the contacts 153 and 154. The motor circuit is then open and motor 137 is maintained in its previously driven position with the output of the pressure regulator constant.

The relay switch 150 includes a contact arm 155 connected to the power line 25 and a normally engaged contact 156 and an automatic contact 157. Contact 156 is connected to the motor 137 in common with the high pressure contact 154. The automatic contact 157 is connected to the low pressure contact 153 of switch 138.

When the switch 151 is open, relay switch 150 is in the normal position shown and a circuit is established from line 25 through switch 150, and drive motor 137 to ground such that motor 137 positions the regulator 129 to increase the pressure in the opening of corresponding switches 127 for turning off the lights 4.

When the switch 151 is closed, the relay 149 is energized and breaks the above described circuit and applies power from line 25 via the contact 157 to the contact arm 152 of the high-low pressure switch 138. If arm 152 engages either of its associated contacts 153 and 154, power is supplied to drive the motor 137 in an appropriate direction to increase or decrease the pressure in the line 128.

The embodiment of FIG. 7 functions to provide the same final result as the circuit of FIG. 2.

If the room illumination is too low, the output of the transducer 17 is below 6 p.s.i. and the pressure switch 138 is placed in the full line position shown. The motor 137 is driven in an appropriate direction to actuate the pressure regulator 129 to reduce the pressure in line 128. As the pressure is reduced, the hydraulic motor 132 is first actuated to retract or open the blind to a completely open position. If this does not raise the light level sufficiently to increase the output of the transducer 17 to position switch 138 in the null range, the pressure continues to drop until the pressure switches 127 are actuated beginning with the first or the lamp row 6 and ending with the lamp row 5.

If the illumination level increases beyond the selected range, the switch 138 is placed in the alternate position and opposite action occurs until the high-low switch 138 is placed in the dead zone.

A manually operable blind close switch 158 is also provided in FIG. 7. Switch 158 is connected between the automatic side of the on-off switch 151 and the solenoid 136. When switch 158 is closed, solenoid 136 is energized and positions the valve 130 to the second position previously described wherein the full line pressure of the main supply line 18 is impressed on the blind motor 132 to effect closing. The lights 4 will still be operated under the automatic control, as in FIG. 2.

The present invention thus provides an illumination controller which will control both the upper and lower limits of the lighting level through the conjoint controlling of a light interrupting means for controlling the natural light and of an artificial lighting means. The present invention provides a simple and reliable control system for providing an improved illumination control having many advantages over the prior art as heretofore explained and set forth.

Various modes of carrying out the invention are contemplated as being within the scope of the following claims particularly pointing out and distinctly claiming the subject matter which is regarded as the invention.

I claim:

1. An illumination controller for regulating the illumination of an enclosure subject to natural lighting and artificial lighting, comprising
   (a) first control means to vary the level of natural lighting,
   (b) second control means to vary the level of artificial lighting,
   (c) light sensitive means providing a control signal proportional to the illumination level in the enclosure, and
   (d) an operating circuit including said first and second control means and said light sensitive means connected to actuate both of the control means in accordance with the illumination level, said operating circuit including interlocking limit switch means actuated by said control means and connected to sequentially energize the first control means and thereafter the second control means for increasing the illumination and to sequentially energize the second control means and thereafter the first control means for decreasing the illumination level.

2. The illumination controller of claim 1, having
   (a) a pressure transducer coupled to the light sensitive means and establishing a corresponding proportional fluid signal, and
   (b) a fluid responsive differential switch means coupled to the transducer for actuation and connected in said operating circuit to actuate the first and second control means.

3. In an illumination controller for controlling the natural and artificial lighting of a room having a window for admitting natural light and a light interrupting means for covering the window and having interior artificial lighting means,
   (a) drive means to position said light interrupting means in a plurality of light transmitting positions and thereby vary the natural lighting intensity,
   (b) drive means to vary the level of the artificial lighting intensity,
   (c) a pair of operating circuits, one for each of said drive means,
   (d) illumination control means responsive to the light intensity in the room to selectively actuate the pair of circuits for said drive means for selectively increasing and decreasing illumination in proportion to the sensed level of the light intensity, said control means including interlocking means to open the light interrupting means completely prior to turning on the artificial lighting means and to reduce the artificial lighting means to a minimum prior to closing of the light interrupting means.

4. The illumination controller of claim 3 wherein said illumination control means includes
   (a) illumination sensing means establishing an electrical signal proportional to the illumination intensity,
   (b) a fluid pressure transducer actuated by said sensing means to establish a proportional fluid signal, and
   (c) a differential switch means responsive to changes in the fluid signal and connected in said circuits for controlling said drive means.

5. In an illumination control for a room having a natural lighting window and a series of lamp means,
   (a) a window covering means for selective covering of the window,
   (b) first motor means for actuating the covering means and positioning the covering means in any one of a plurality of positions,
   (c) switch means for controlling said lamp means,
   (d) second motor means for actuating said switch means,
   (e) an electrical signal generating means responsive to the illumination level in the room,
   (f) an electrically actuable transducer means coupled to said generating means and having an output means establishing a proportional fluid signal pressure in accordance with the illuminaion level,
   (g) a high-pressure switch connected to control said first and second motor means and connected to the output means of the transducer, said switch being operated at a selected pressure,
   (h) a low-pressure switch connected to control said first and second motor means and connected to the output means of the transducer, said low-pressure switch being operated at a selected pressure below that of the high-pressure switch, said switches establishing an illumination intensity range to be maintained, and
   (i) interlock means interconnecting said high-pressure switch and said low-pressure switch for actuation of said first and second motor means for increasing illumination by proportionately actuating said covering means to increase the illumination to a maximum natural lighting and thereafter actuating said lamp means to compensate for deviation of the illumination from said predetermined intensity range and for reducing illumination by proportionately actuating said lamp means to a minimum artificial lighting and thereafter actuating said covering means to reduce the natural lighting.

6. In an illumination controller for controlling the natural and artificial lighting of a room having a window means for admitting natural light and light interrupting means for covering the window means and having interior artificial lighting means, (a) electrically actuated means for actuating said interrupting means and said lighting means, (b) illumination control means including a first circuit for energizing and electrically actuated means to sequentially actuated said light interrupting means to a plurality of different light interrupting positions and said artificial lighting means to a plurality of illumination levels to increase illumination and a second circuit for energizing said electrically actuated means to sequentially actuate said artificial lighting means to a plurality of illumination levels and said light interrupting means to a plurality of different light interrupting positions to decrease illumination, and (c) illumination sensing means for alternately and selectively conditioning said circuits in accordance with the illumination intensity in the room, and said electrically actuated means including, first motor means coupled to said artificial lighting means, second motor means coupled to said light interrupting means, a limit switch means connected in said first circuit and coupled to said first motor means, said limit switch being open in response to maximum energizing of the artificial lighting means, a limit and transfer switch means connected in said second circuit and having a first closed position connected to the first motor means and a second position connected to the second motor means, said limit and transfer switch assuming the first position with the artificial lighting means energized and the second position with the lighting means off, a second limit switch means connected in said second circuit with the second poistion of the limit and transfer switch, said limit switch being open in response to complete closing of the interrupting means, and a second limit and transfer switch means connected in said first circuit and having a first closed position connected to said second motor means and a second closed position connected to said first limit switch, said second limit and transfer switch assuming the first position with the interrupting means closed and the second position with the interrupting means fully open.

7. The illumination controller of claim 6 having, (a) a main on-off switch means having an automatic position for connecting power to said first and second circuits and an off position for directly connecting power to said first motor means in series with said first position of the first named limit and transfer switch means, and (b) an interrupting means switch having a first position in said first and second circuits conditioning them for energizing and a second position disconnecting the second motor means from said first and second circuit and for connecting the second motor means directly to power through the second limit switch.

8. An illumination controller for a room having an exterior window wall selectively covered by a shade means and a plurality of rows of lights, comprising (a) a reversible light control motor having an on winding and an off winding connected in common at one end and each having an input end, (b) a stepping switch bank having a light switch means for each light group and sequentially actuating said lights with the innermost row turned on first and the outermost row turned on last and a pair of motor control switch means connected respectively one each to the input end of said windings, the motor control switch means connected to the on winding constituting a light-motor limit switch means and the switch means connected to the off winding being a light-motor limit and transfer switch means, (c) a reversible shade control motor having an opening winding and a closing winding connected in common at one end and each having an input end, (d) means coupling the shade control motor to the shade means, (e) a pair of shade motor switch means coupled to the shade control motor and connected one each to the input end of said shade control motor windings, the switch means connected to the closing winding being a shade motor limit switch means and the switch means connected to opening winding being a shade motor limit and transfer switch means, (f) an upper level switch means, (g) a lower level switch means, (h) cell means for sensing the illumination in the room and actuating the upper level switch means when the illumination reaches a predetermined level and actuating the lower level switch means when the illumination reaches a second predetermined level less than said first predetermined level, (i) a first motor energizing circuit including said upper level switch means connected to the off winding and the motor limit and transfer switch means and said shade motor limit switch means and said closing winding for sequentially turning off said lights and closing said shade means in response to closing of the upper level switch means, and (j) a second motor energizing circuit including said lower level switch means connected with said shade motor limit and transfer switch means and said opening winding of said shade control motor and said light motor limit switch means and said on winding for sequentially opening the shade means and turning on said lights in response to closing of the lower level switch.

9. The controller of claim 8, having (a) an on-off power switch means for selectively connecting energizing circuits to a power source and for connecting said first motor energizing circuit to a power source independently of the upper level switch means.

10. The controller of claim 8, having (a) a blind close switch means connected in said energizing circuits and having a position for directly connecting the shade motor limit switch and the lamp motor limit switch to a power source.

11. The controller of claim 8, wherein (a) said light motor limit switch means includes contacts coupled to the light control motor and opened thereby to limit actuation of the artificial lighting means, (b) said light motor limit and transfer switch means includes first contacts connecting the off winding to the level switch means and second contacts connecting the shade motor limit switch to the level switch means, said contacts being coupled to the light control motor for opening and closing, (c) said shade motor limit switch means includes contacts coupled to the shade control motor and opened thereby to limit the closing of the shade means, and (d) said shade motor limit switch means includes first contacts connecting the opening winding to the lower level switch means and second contacts connecting the on winding to the lower level switch means, said contacts being coupled to the shade control motor for opening and closing.

12. The illumination controller of claim 1 for controlling the natural and artificial lighting of a room having a plurality of spaced windows for admitting natural light and individual light interrupting means for each window and having interior artificial lighting means,
- (a) a separate hydraulic motor means for positioning each of said light interrupting means,
- (b) a common means for controlled delivery of operating fluid to said hydraulic motor means, and
- (c) said first control means including motor means for controlling said common means.

13. In an illumination controller for controlling the natural and artificial lighting of a room,
- (a) high density shade means to completely interrupt the natural lighting of the room,
- (b) low density means to partially interrupt the natural lighting of the room,
- (c) sensing means to sense the illumination intensity, and
- (d) illumination control means connected to the sensing means to selectively actuate the artificial lighting means and the shade means to maintain a predetermined light intensity in the room, said means including interlocking means whereby both the shade means completely open prior to turning on artificial lighting means and the latter turn off completely prior to opening of the shade means.

14. The controller of claim 13 having
- (a) a first limit switch and a first limit-transfer switch positioned in accordance with the high density shade means,
- (b) a second limit switch and a second limit-transfer switch positioned in accordance with the low density shade means, and
- (c) means connecting said switches in the control means whereby the low density shade means is the first to close and last to open and said high density shade means is the last to close and the first to open.

15. In an illumination controller for controlling groups of artificial lighting means within an enclosure and a shade means for a natural lighting opening therein, which comprises,
- (a) a plurality of fluid pressure operated switch means coupled to actuate said groups of lighting means, said switch means being selected to be actuated by a series of differential pressures for sequential actuation of the lighting means,
- (b) a fluid pressure operated shade means coupled to actuate said shade means and being actuated by a differential pressure greater than for said lighting means,
- (c) a solenoid valve connected to the shade means and having a first position and a second position, said second position connecting said shade means to a main pressure supply line,
- (d) a pressure regulator having an input supply line and an output line connected to said switch means and to said solenoid valve, the first position of the solenoid valve connecting the output line to the shade means,
- (e) a reversible motor drive for said pressure regulator,
- (f) a fluid operated sensing switch means for selectively connecting said reversible motor to a power source,
- (g) an illumination sensing means connected to actuate the sensing switch means to actuate said motor in opposite directions in response to an increase and to a decrease in the illumination level from a selected illumination range,
- (h) a relay means having switch means for selectively connecting the motor to the power supply for turning off the artificial lighting means and to the sensing switch means for control of the motor in response to the illumination level,
- (i) an on-off switch for connecting said relay means to the power supply, and
- (j) a close blind switch connected to the solenoid valve for selectively actuating the solenoid valve to said second position.

References Cited
UNITED STATES PATENTS

| | | | |
|---|---|---|---|
| 2,083,726 | 6/1937 | Mason | 156—28 |
| 2,357,440 | 9/1944 | Williams | 200—81.5 |
| 3,128,384 | 4/1964 | Nelson et al. | 250—205 |
| 3,236,290 | 2/1966 | Lueder | 250—229 |

RALPH G. NILSON, *Primary Examiner.*

WALTER STOLWEIN, *Examiner.*

M. ABRAMSON, *Assistant Examiner.*